US007779369B1

(12) United States Patent
Dassow et al.

(10) Patent No.: US 7,779,369 B1
(45) Date of Patent: Aug. 17, 2010

(54) METHOD FOR THE GRAPHIC REPRESENTATION AND/OR PROCESSING VALUES OF DATA TYPES

(75) Inventors: Heiko Dassow, Griesheim (DE); Ulrike Hartmer, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/913,371

(22) PCT Filed: Jan. 19, 2000

(86) PCT No.: PCT/EP00/00386

§ 371 (c)(1),
(2), (4) Date: Aug. 13, 2001

(87) PCT Pub. No.: WO00/48072

PCT Pub. Date: Aug. 17, 2000

(30) Foreign Application Priority Data

Feb. 11, 1999 (DE) ................................ 199 05 630

(51) Int. Cl.
*G06F 3/048* (2006.01)

(52) U.S. Cl. ....................................... 715/853; 715/781

(58) Field of Classification Search ................. 345/853, 345/854, 806, 807, 800, 801, 762; 707/101, 707/102, 3, 100; 709/218
See application file for complete search history.

(56) References Cited

U.S. PATENT DOCUMENTS 4,710,763 A * 12/1987 Franke ........................ 340/723

| 5,710,901 | A | * | 1/1998 | Stodghill | 395/339 |
| 5,913,063 | A | * | 6/1999 | McGurrin | 395/702 |
| 5,920,866 | A | * | 7/1999 | Crim | 707/100 |
| 5,987,469 | A | * | 11/1999 | Lewis | 707/102 |
| 6,278,991 | B1 | * | 8/2001 | Ebert | 707/3 |
| 6,496,208 | B1 | * | 12/2002 | Bernhardt | 345/853 |
| 6,701,352 | B1 | * | 3/2004 | Gardner et al. | 709/218 |

FOREIGN PATENT DOCUMENTS

EP 0 606 788 7/1994

OTHER PUBLICATIONS

Arazi, "Binary-to-Decimal conversion based on the divisibility of 2An-1 by 5", IEEE Electronic Letters, Nov. 5, 1992, No. 23, p. 2151.*
Brydon, "Access Tutorial 8: Combo Box Controls", 8/2597, http://mis.bus.sfu.ca/tutorials/MSAccess/tutorials/combo.pdf.*
Brydon, "Access Tutorial 8: Combo Box Controls", Aug. 25, 1997, http://mis.bus.sfu.ca/tutorials/MSAccess/tutorials/combo.pd.*

(Continued)

*Primary Examiner*—Boris Pesin
(74) *Attorney, Agent, or Firm*—Kenyon & Kenyon LLP

(57) ABSTRACT

In a method for graphically representing and/or processing values of data types of a formally defined data structure existing as a value tree, a window is assigned as a graphical user interface to the data structure. Generic, scalable, graphical user-interface components are inserted hierarchically in the window, the value tree of the data structure being mapped onto the user-interface components. The graphical user-interface components are in a relation to the nodes of the value tree that is recognizable to the user. A graphical or textual representation of the value is selectable for each subtree of the value tree.

9 Claims, 2 Drawing Sheets

OTHER PUBLICATIONS

PCT International Search Report for PCT/EP00/00386, mailed on Aug. 1, 2000.

Wang et al., "A Language-Based Editing Process for Visual Object-Oriented Programming", Software Engineering Notes, US, Association for Computing Machinery. New York. 23(4):70-75. Jul. 1998.

Robson et al., "Visual Editing of Data Structures", Proceedings of the Conference on Software Maintenance. 1994 International Conference on Software Maintenance, US. Los Alamitos. IEEE. Comp. Soc. Press, Oct. 15, 1991. pp. 228-237.

Mcauliffe D., "An Implemenation of the Schematic Pseudocode Approach", Computer, US, IEEE Computer Society, Long Beach, California. 22(10):73. Oct. 1, 1989.

* cited by examiner

```
GetArgument ::= SEQUENCE {
    baseManagedObjectClass          BaseManagedObjectClass
    baseManagedObjectInstance       GraphicString
}
BaseManagedObjectClass::=CHOICE {
    globalForm                      OBJECT IDENTIFIER
    localForm                       INTEGER
}
```

METHOD FOR THE GRAPHIC REPRESENTATION AND/OR PROCESSING VALUES OF DATA TYPES

FIELD OF THE INVENTION

The present invention relates to a method for graphically representing and/or processing values of data types of a formally defined data structure existing as a value tree.

BACKGROUND INFORMATION

Programming and description languages may require a formal syntax to describe data types and their values. Methods are believed to be available for defining data structures using a formal notation, independently of a specific language. The data types defined in accordance with one of these methods may be of a desired complexity and may dynamically change in part. Thus, such data types should be clearly represented for display purposes or to enable user input of values. This should be done for the management of communications networks, since very complex data structures may be processed in these networks.

In various languages and syntax notations, rules exist for textually representing values. Thus, for example, when working with ASN.1 data types in accordance with ITU-T recommendation X.208, the value is represented as a character string in a manner, which is not believed to be very straightforward.

It is believed that the structure of the data type may be recognizable when the form of representation of a tree is used. A representation of this kind is discussed in the reference "IBM TMN Development Platform", Piscataway, N.J., U.S.A., 1998. Another method is believed to include assigning the value of an attribute to a graphic component by manually creating rules, for example, defining the color of the graphic object by the value of the data type, discussed, for example, in the reference "Objective Systems Integrators: NetExpert Framework Overview", Folsom, Calif., U.S.A., 1997.

Since any data type definitions at all may be possible, it is believed that the available methods may expend a great deal of time programming a separate graphical user-interface window for each new data type.

SUMMARY OF THE INVENTION

An exemplary embodiment and/or exemplary method of the present invention is directed to reducing the time expenditure on programming and to achieve a straightforward and clear representation, which will enable the data structure to be tested and, if desired, processed.

Another exemplary embodiment and/or exemplary method of the present invention is directed to providing that:
  a window may be assigned as a graphical user interface to the data structure;
  generic, scalable, graphical user-interface components may be inserted hierarchically in the window, the value tree of the data structure being mapped onto the user-interface components;
  the graphical user interface components may be in a relation to the nodes of the value tree in a manner that is recognizable to the user; and
  a graphical or textual representation of the value may be selectable for each subtree of the value tree.

The clear, straightforward representation of a complex data type using the exemplary method in accordance with the present invention may save the user from having to search extensively for definitions and may help to avoid errors when inputting values for this data type. In this context, the exemplary method of present invention may provide the concealing of redundant information and the presenting of information in detail, since an exemplary embodiment and/or exemplary method of the present invention is directed to providing that each user has a chance to decide which information should be displayed and for which information a compact representation suffices. Another exemplary embodiment and/or exemplary method of the present invention is directed to providing a simple value assignment to be made in the processing of the data types.

Another exemplary embodiment and/or exemplary method of the present invention is directed to providing for a simple and secure value assignment to be carried out in that, for a processing of the value tree, a list of all values which are compatible with respect to assignment with the represented data type may be derived for each node, and that, in each case, one value may be selected from the list for a value assignment. To avoid input errors, it may be provided when compiling value lists, that the number of values to be accepted in the list are restricted in accordance with predefined rules, depending on the current context.

Another exemplary embodiment and/or exemplary method of the present invention is directed to providing for a visualization of the window to be first undertaken at the time of an initialization of the graphical user interface and, after that, data, for example, value lists, to be initialized, which may be derived for a processing. As a result of the faster display build-up associated therewith, the user may already obtain an overview of the data structure before all data required for displaying and processing the data type are initialized.

Another exemplary embodiment and/or exemplary method of the present invention is directed to providing that a data type may be graphically displayed when no additional information, described as metadata, on the data type is available in the graphical interface application, when the value to be represented is transferred in a transfer syntax, which contains all necessary information for the representation with respect to the data type and the value assignment.

Another exemplary embodiment and/or exemplary method of the present invention is directed to providing data types, whose exact type assignment may first be determined at the execution time in accordance with the late binding principle, and inserted as a dynamically changeable subtree in the value tree represented by the graphical user interface. From this, an advantage for these data types may be that the representation of the current value assignment does not first require opening subwindows (or subforms), but may take place directly in the main window.

Another exemplary embodiment and/or exemplary method of the present invention is directed to providing that for data types whose exact type assignment may be first defined in accordance with the late binding principle at the execution time by the marking of another node (for example, "ANY DEFINED BY" in the description language ASN.1), the user may be prompted to input whether the assignment should be carried out automatically or following a manual input. Thus, an assignment may occur when the information required for the automatic assignment is not available.

Another exemplary embodiment and/or exemplary method of the present invention is directed to providing that values may be transferred from one subtree into another by intermediately storing and clicking on the subtree in question. In the process, an assignment compatibility of the data types may be assigned to the subtrees. However, it may not be necessary for the data types to be instantiated within the same value tree.

Another exemplary embodiment and/or exemplary method of the present invention is directed to providing a simple use, together with other programs, and the simple mapping of the overall identity in that the exemplary method may be implemented by one or more program modules that may be integrated in the application programs.

Another exemplary embodiment and/or exemplary method of the present invention is directed to providing that additional information to be displayed may be stored for each node of the value tree which may be uniquely named by the displayed type and the relation to the higher-order type. In this manner, additional text elements may be displayed for specific data types, which may be produced at any point in time following the program creation, and which may be dynamically integrated in the interface at the execution time.

Another exemplary embodiment and/or exemplary method of the present invention is directed to providing continual checking during inputting of a value to determine whether the input value is permissible for the corresponding data type, and whether the input value is identical to the currently active value of the data type, and that the result be made known to the user. Another exemplary embodiment and/or exemplary method of the present invention is directed to further enhancing security and the speed attained in the processing of data types.

Another exemplary embodiment and/or exemplary method of the present invention is directed to providing that the display and/or the processing may be facilitated in that the display format may be altered already at the time that a value is input and, thus, for example, a numerical value may be either displayed as a decimal or binary value, before a value is accepted into the value tree.

DETAILED DESCRIPTION

Figures 1, 2:
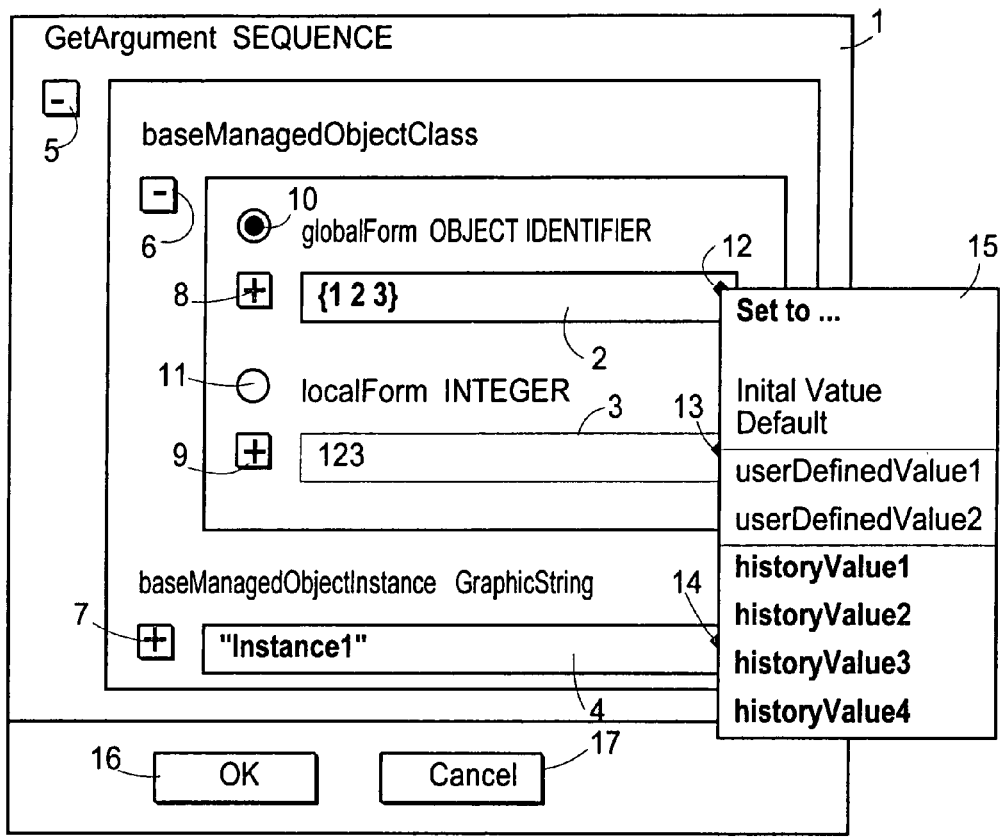
FIG. 1 shows a window of a graphical user interface according to an exemplary embodiment and/or exemplary method of the present invention.
FIG. 2 shows a formal data definition in accordance with ASN.1.

FIG. 1 shows the relevant graphical user interface as a window 1, in which all included data types are contained as graphical user-interface components. The root of the value tree (FIG. 3) is indicated by the GetArgument SEQUENCE. Input bars 2, 3 and 4, having the labels "globalForm", "localForm" and "baseManagedObjectInstance" correspond to the leaf objects of the value or GUI tree. Buttons 5 through 9 can be used to select between a textual representation (minus) and a graphic representation (plus) for each node and each leaf object.

Other buttons 10, 11 (radio buttons) may be used to select between two data types to be alternatively processed (in this case, leaf objects). Input bars 2, 3, 4 are each provided with a button 12, 13, 14, which can be used to open a window 15 for selecting values stored as constants.

In addition, the graphical user interface has buttons 16, 17 for terminating the processing and storing the processed data, as well as for exiting the graphical user interface without storing the data.

FIG. 2 shows the definitions of the data types "GetArgument" and "BaseManagedObjectClass" in the form of a structured text. The type "GetArgument" includes two components, "baseManagedObjectClass" and "baseManagedObjectInstance", the names being given to the left, and the types of the components to the right, namely "BaseManagedObjectClass" and GraphicString". The type "BaseManagedObjectClass" is a CHOICE having likewise two components, namely "globalForm" of type "OBJECTIDENTIFIER" and "localForm" of type "INTEGER".

Figure 3:
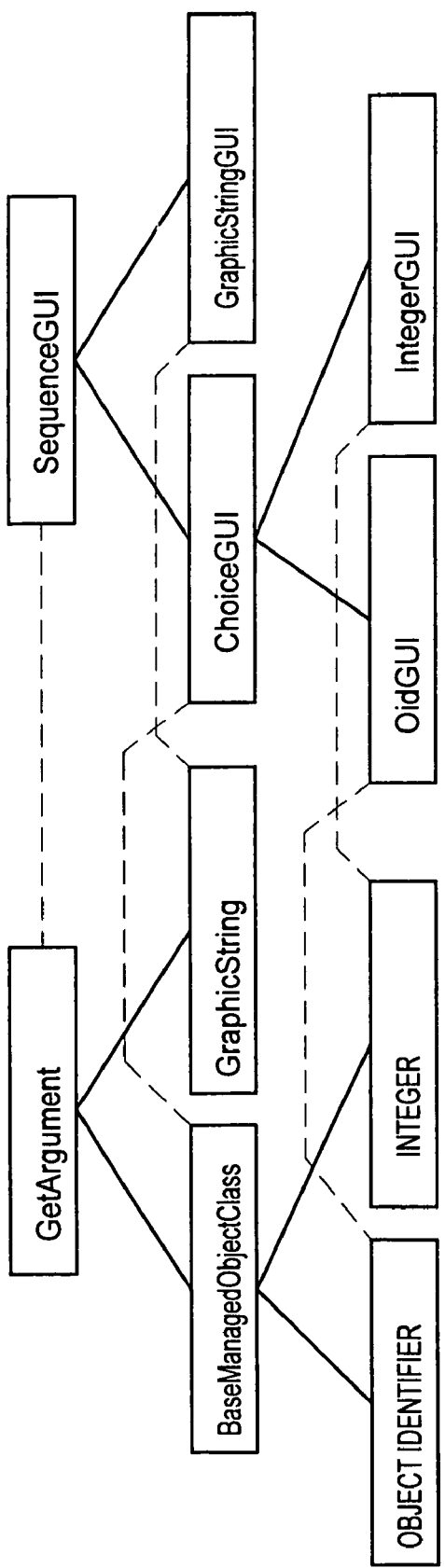
FIG. 3 shows the principle of a generic, graphic representation.

FIG. 3 shows the principle of a generic, graphic representation of the formal data definition illustrated in FIG. 2. In this context, the value tree is shown to the left, while the graphic representation is indicated to the right. In this instance and in the text that follows, the abbreviation GUI (=Graphical User Interface) is also used for the graphical user interface. Solid lines running between the blocks signify that the underlying or subjacent elements are contained in the node situated above them, while the dotted lines signify that each graphic representation is in relation to the particular data type.

What is claimed is:

1. A method for graphically representing a value of a data type of a formally defined data structure existing as a value tree, comprising:

assigning a window as a graphical user interface to the data structure;

inserting hierarchically at least one generic, scalable, graphical user-interface component in the window, the value tree of the data structure being mapped onto the at least one user-interface component;

providing that the at least one graphical user interface component is in a recognizable relation to at least one node of the value tree;

providing at least one of a graphical representation and a textual representation of the value is selectable for each subtree of the value tree; and for a processing of the value tree, deriving for each node a value list of all of values compatible with respect to assignment with the data types, and selecting one of the value from the value list for each value assignment; wherein, when compiling the value list, the number of the values to be accepted in the list being restricted in accordance with predefined rules depending on the current context, wherein a visualization of the window is first undertaken at a time of an initialization of the graphical user-interface and, after that, at least one of data and the value list is initialized, which are derived for a processing and wherein the value to be represented is transferred in a transfer syntax containing all necessary information for the representation with respect to the data type and the value assignment, the value transferable from the subtree to another subtree by intermediately storing and clicking on the subtree, and wherein the data type, whose exact type assignment can first be determined at execution time in accordance with a late binding principle, is inserted as a dynamically changeable subtree in the value tree represented by the graphical user-interface, and wherein additional information to be displayed is storable for each of the at least one node of the value tree which can be uniquely named by a displayed type and a relation to the higher-level type.

2. The method of claim 1, further comprising:

continually checking during an inputting of the value of the data type in the value tree to determine whether an input value is permissible for a corresponding data type and to determine whether the input value is identical to a currently active value of the corresponding data type; and making known to a user a result of the continually checking.

3. A method for graphically representing a value of a data type of a formally defined data structure existing as a value tree, comprising:

assigning a window as a graphical user interface to the data structure;

inserting hierarchically at least one generic, scalable, graphical user-interface component in the window, the value tree of the data structure being mapped onto the at least one user-interface component;

providing that the at least one graphical user interface component is in a recognizable relation to at least one node of the value tree;

providing at least one of a graphical representation and a textual representation of the value is selectable for each subtree of the value tree; and for a processing of the value tree, deriving for each node a value list of all of values compatible with respect to assignment with the data types, and selecting one of the value from the value list for each value assignment; wherein, when compiling the value list, the number of the values to be accepted in the list being restricted in accordance with predefined rules depending on the current context, wherein a visualization of the window is first undertaken at a time of an initialization of the graphical user-interface and, after that, at least one of data and the value list is initialized, which are derived for a processing and wherein for the data type whose exact type assignment is first defined in accordance with a late binding principle at an execution time by a marking of another node, a user is prompted to input information as to whether the exact type assignment should be performed one of automatically and following a manual input.

4. The method of claim 1, wherein the method is implemented by at least one program module that is integratable in an application program.

5. The method of claim 3, wherein the method is implemented by at least one program module that is integratable in an application program.

6. The method of claim 2, wherein a display format is alterable when the value is inputted before the value is accepted into the value tree.

7. The method of claim 1, wherein the marking of the another node includes "ANY DEFINED BY" in a description language ASN.1.

8. The method of claim 3, wherein the marking of the another node includes "ANY DEFINED BY" in a description language ASN.1.

9. The method of claim 6, wherein a numerical value is displayed as one of a decimal value and a binary value.

* * * * *